United States Patent [19]

Ney et al.

[11] Patent Number: 4,672,516
[45] Date of Patent: Jun. 9, 1987

[54] PRIMARY SIDE CLOCK SINGLE-ENDED FORWARD CONVERTER WITH CONNECTIBLE SECONDARY CIRCUITS AND HAVING SWITCHABLE ACTUAL VALUE FEED FOR THE OUTPUT VOLTAGE CONTROL

[75] Inventors: Janusz Ney, Igling; Horst Bartussek, Augsburg, both of Fed. Rep. of Germany

[73] Assignee: Siemens Aktiengesellschaft, Berlin and Munich, Fed. Rep. of Germany

[21] Appl. No.: 830,106

[22] Filed: Feb. 18, 1986

[30] Foreign Application Priority Data

Feb. 25, 1985 [DE] Fed. Rep. of Germany ....... 3506575

[51] Int. Cl.[4] ............................................. H02M 3/24
[52] U.S. Cl. ....................................... 363/16; 363/21; 363/67
[58] Field of Search ....................... 363/16, 21, 67, 70, 363/90, 97

[56] References Cited

FOREIGN PATENT DOCUMENTS

| 111365 | 6/1984 | European Pat. Off. | 363/21 |
| 144775 | 11/1980 | Japan | 363/21 |
| 2079014 | 12/1981 | United Kingdom | 363/21 |

Primary Examiner—William H. Beha, Jr.
Attorney, Agent, or Firm—Hill, Van Santen, Steadman & Simpson

[57] ABSTRACT

A single-ended flow converter which is clocked at the primary winding side and which is provided with a controller and monitor and comprises a plurality of switched power packs that are connected by secondary windings and are each composed of an electronic switch, a storage inductor, a free wheeling diode and a smoothing capacitor for supplying power to a DC user. The flow converter is compact and has high efficiency and has at least one secondary winding (T3 III) which has a further switch power pack (2) associated to it such that one electronic switch (V19) has its storage inductor (L2a) connected to the end of one winding of the secondary winding (T3 III) and has a second electronic switch (V18) which has its storage inductor (L2b) connected at the other end of the secondary winding (T3 III) and at least one of the free wheeling diodes (V7, V8) and the smoothing capacitors (C4 and C5) have at least one terminal connected to ground. A second switch (K1) is connected between one end of the secondary winding (T3 III) and the end of one further secondary winding (T3 III). A changeover switch (K2) is actuated depending upon the second switch (K1) has its first switching contact connected via a resistor (R5) are connected via a second resistor (R6) at the voltage output of another of said power packs (3). The common contact of the switch (K2) is connected to ground through a third resistor (R9) and is connected to the input of the controller (RÜ).

10 Claims, 3 Drawing Figures

PRIMARY SIDE CLOCK SINGLE-ENDED FORWARD CONVERTER WITH CONNECTIBLE SECONDARY CIRCUITS AND HAVING SWITCHABLE ACTUAL VALUE FEED FOR THE OUTPUT VOLTAGE CONTROL

BACKGROUND OF THE INVENTION

1. Field of the Invention

This invention relates to a single-ended flow converter which is clocked at the primary side and is provided with a controller and the single-ended flow converter comprises a plurality of switched power packs that are connected by secondary windings and each are composed of an electronic switch, a storage inductor, a free-wheeling diode and a smoothing capacitor and each respectively supply a DC user.

2. Description of the Prior Art

Prior art single-ended flow converters are larger and more expensive than the present invention and utilize more components.

SUMMARY OF THE INVENTION

Communication terminal equipment which is suitable for integrated services are particularly distinguished by their compact form so that they can be located on a desk and the principal component such as keyboard and telephone receivers with holder can be positioned and used independently of each other.

Due to the compact nature of these devices, the power supply must be accommodated in a relatively small volume and this raises problems with respect to heat dissipation and also with respect to the dimensioning of the power supply.

It is, therefore, an object of the present invention to create a power supply which assures a high efficiency and is compact.

So as to achieve this object, the power supply is provided as a single-ended flow converter which is clocked at its primary side and provided with a regulator which is constructed such that at least one secondary winding has a further switched power pack associated with it such that the one electronic switch has its associated storage inductor positioned at the start of the winding of the one secondary winding and the other electrical switch has its storage inductor lying at the end of the one secondary winding and at least one of the associated free-wheeling diodes and the smoothing capacitors have one terminal connected to ground and also wherein a second switch is mounted between the end of the one secondary winding and the start of a further secondary winding and wherein a switch-over means is actuated dependent on the second switch and has a first switch-over contact connected by a first resistor to a voltage conducting output of one of the switched power packs connected at the secondary side and has a second switch-over contact connected by a second resistor to a voltage conducting output of another of the switched power packs connected at the secondary side and wherein a common switch contact of the switch-over means is connected to ground through a third resistor and to the input of the regulator.

In a further development of the invention, the additional switch and the switch-over means can be formed as semiconductor switches.

Also, the second switch can be formed such that a slow time dependent rise of the voltage occurs when it is switched on and the switch-over means does not switch until shortly before the rated voltage is reached.

Due to these measures, a single-ended flow converter is obtained wherein DC voltages not required in standby mode can be disconnected. Since all main parts of the circuit are employed in full operation as well as in standby mode, certain components and space required for prior art devices can be eliminated. Also, a high efficiency and high reliability in the circuit are achieved.

Other objects, features and advantages of the invention will be readily apparent from the following description of certain preferred embodiments taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
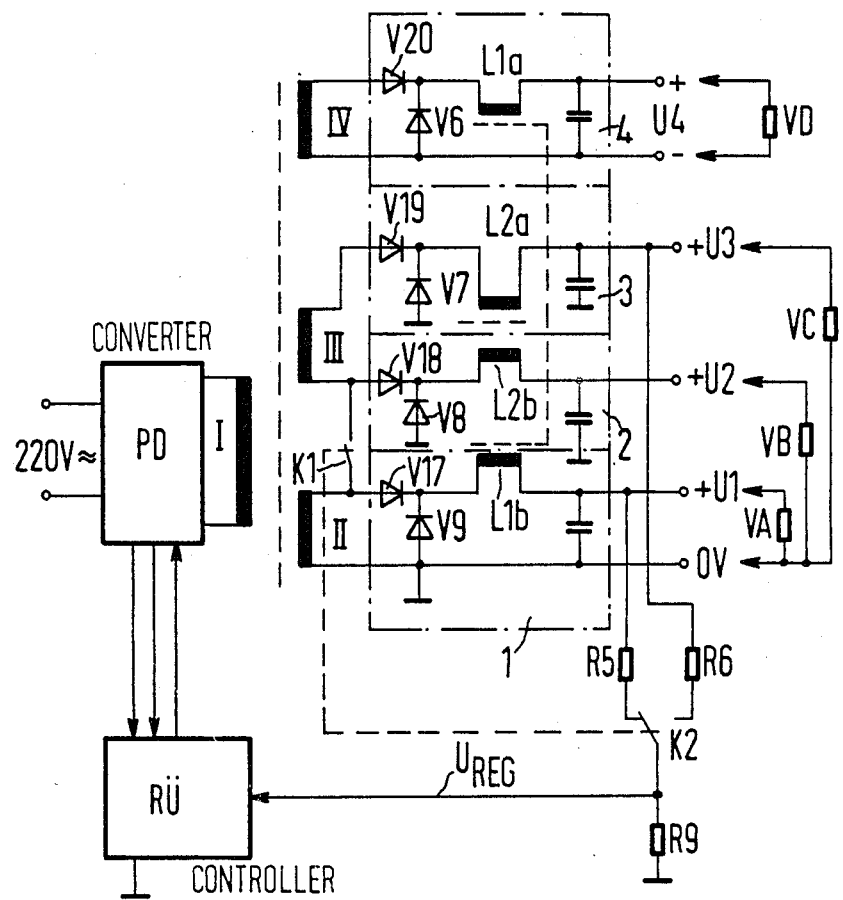
FIG. 1 is a fundamental circuit diagram of a single-ended flow converter.

The flow converter PD has a primary winding I which is connected to a control and monitoring device RÜ as illustrated. The primary winding I of the repeater feeds three secondary windings II, III and IV as illustrated. Secondary winding II has one end connected to a first diode switch V17 which is connected to a storage inductor L1b. A free-wheeling diode V9 is connected as illustrated between the junction point between the switch V17 and the inductor L1b and ground and a storage capacitor 1' is connected between the second end of the storage inductor L1b and ground as illustrated. Output terminals 0V and plus U1 are connected to a first user VA. The second secondary winding III has one end connected to a first switch V18 which has its other side connected to a storage inductor L2b. A free-wheeling diode V8 is connected between ground and the junction point between the switch V18 and the inductor L2b and a storage capacitor 2' is connected between the second end of the storage inductor L2b and ground. An output terminal U2 is provided for a second use VB. The second end of the secondary winding III is connected to a first switch V19 which has its other side connected to a storage inductor L2a and a storage capacitor 3' is connected between the second end of the inductor L2a and ground. A free-wheeling diode V7 is connected between the junction point between the switch V19 and inductor L2a and ground. A third user VC can be connected to the output terminal plus U3.

The third secondary winding IV has one end connected to a first switch V20 which has its other side connected to a storage inductor L1a. A free-wheeling diode V6 is connected from the junction point of the switch V20 and L1a and the second side of the secondary IV. A storage capacitor 4' is connected across the output terminals +U4 and −U4 for supplying a fourth user VD.

A switch K1 is connected from the junction point of the secondary winding II and switch V17 and the junction point between the secondary winding III and the switch V18.

A switch-over means K2 has its common switch contact connected to the input of the control and monitoring device RÜ as well as to a resistor R9 which has its other side connected to ground. A contact of the switch is connected to a resistor R5 which is connected to the output terminal U1. Another contact of the switch K2 is connected to a resistor R6 which has its other side connected to the output terminal plus U3.

The second secondary winding III of the transformer has a first electronic switch V18 at one end thereof and a second electronic switch V19 at the other end thereof and this design allows a simultaneous feed of two users and in combination with the second switch K1 allows a disconnect of the second user VB and of the third user VC.

The non-disconnectable voltages are generated in parallel operation. In this condition, the second switch K1 is in the open position and the switch-over means K2 connects the resistors R5 and R9. The voltage of the first user VA (5 volts) is regulated in this case. The second switch K1 is closed during full operation and the switch-over means K2 connects the resistor R6 to the resistor R9. In this condition, the voltage of the third user VC (12 volts) is regulated.

Figure 2:
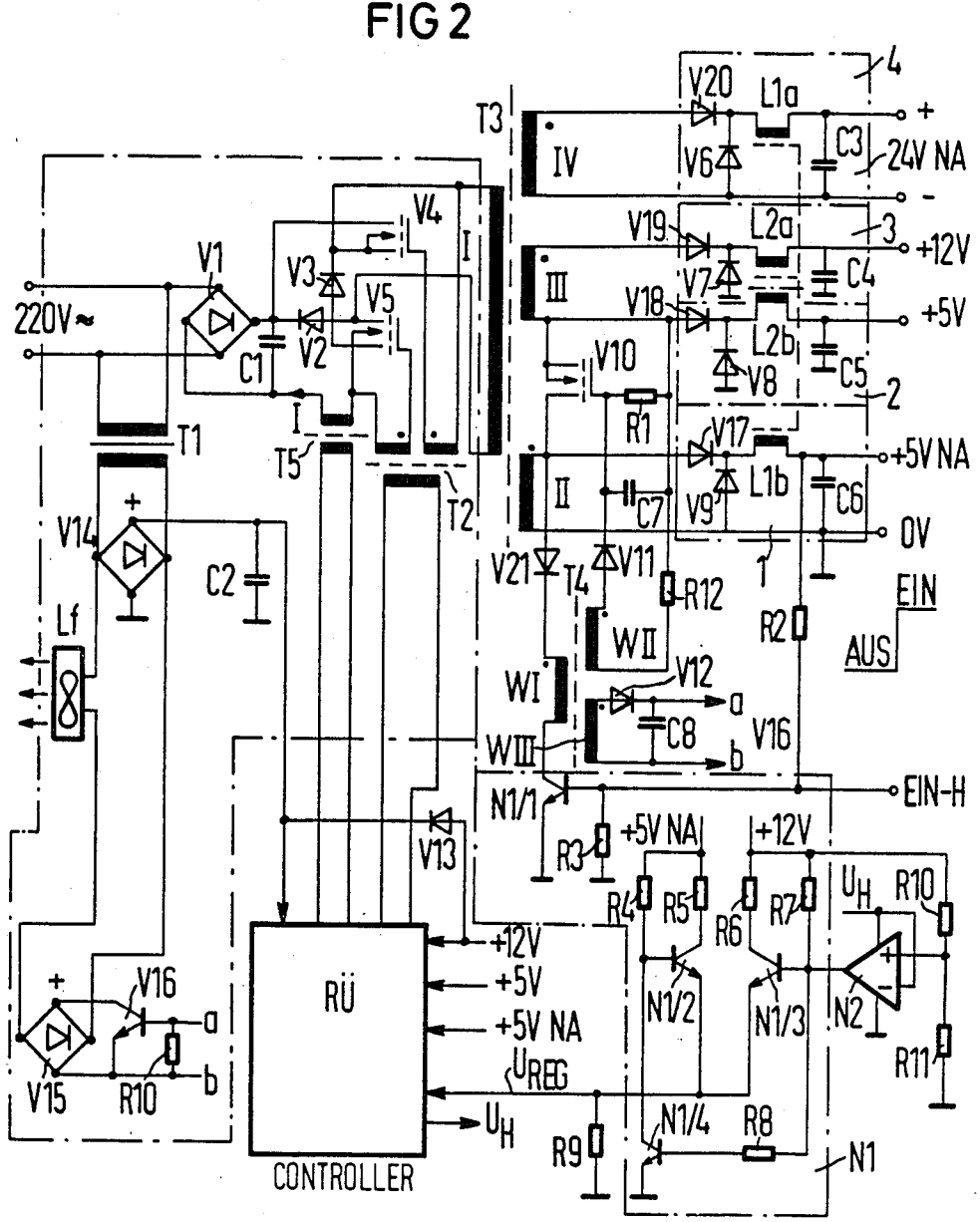
FIG. 2 is an electrical schematic of a first embodiment of the invention.

FIG. 2 illustrates the technical realization of the fundamental circuit of FIG. 1. A second transformer T1 has its primary connected to the 220 volt source and has its secondary connected to feed the control and monitoring circuit RÜ during turn-on and in parallel operation. During full operation, the control and monitoring circuit RÜ is fed by this voltage with the assistance of a first diode V13 in certain operating conditions. A current transformer T5 monitors the current flowing in the primary circuit and when the current exceeds an allowable limit, for example, such as when a short occurs at the output, the drive signals for the switching transistors V4 and V5 are inhibited and the current supply is shut off using monitoring logic. Turn-on occurs again on the basis of turn-off and return on of the network.

In the embodiment of FIG. 2, the second switch K1 and the switch-over means K2 illustrated in FIG. 1 are semiconductors and the second switch K1 comprises a MOS transistor V10 and the switch-over means K2 comprises an integrated circuit. The second switch K1 formed as an MOS transistor V10 is switched on by a first secondary winding WII of a third transformer T4 following rectification by the second diode V11 and smoothing of the alternating voltage by the second capacitor C7. The alternating current fan for the power supply is connected to the AC line in a similar fashion by the secondary winding WIII of the third transformer T4 and through the third diode V12, the third smoothing capacitor C8, the first transistor V16 and the bridge rectifier V15. It is to be noted terminals a and b are connected to terminal a and b. The primary winding W1 of the third transformer T4 is connected to the square AC voltage of the first secondary winding II of the first transformer T3 by the transistor N1/1 which is mounted in the integrated circuit RC. The fourth diode V21 allows a reliable demagnetization of the third transformer T4.

The voltages of the second and third users VB and VC are slowly switched on with the MOS transistor V10 so as to prevent a response of the current limitation. The turn-on time is defined by the second capacitor C7 and the resistor R12.

The function of the switch-over means K2 in the circuit arrangement of FIG. 1 is accomplished with the circuit having the transistors N1/2, N1/3 and N1/4 which are formed as an integrated circuit. This circuit is controlled by the operational amplifier N2. The reference voltage $U_H$ which is generated in the control and monitoring device RÜ is at the negative input of the operational amplifier N2. The output voltage of the third user VC (12 volts) is supplied to the positive input using the resistor divider R10 and R11. When the arrangement is operated in standby mode, the output of the operational amplifier is at the zero voltage potential. The fourth transistor N1/4 of the integrated circuit is thus inhibited. The second transistor N1/2 of the integrated circuit is driven into its saturated condition by the base resistor R4 which is at the output of the first user VA. The voltage of the first user VA (5 volts NA) is supplied to the control circuit as the actual value using the further resistor divider comprising the resistors R5 and R9. After the ON-H signal has been applied, the voltages for the second and third users VB and VC (5 volts and 12 volts) slowly rises. The output of the operational amplifier N2 switches to H shortly before the output voltage for this third user reaches the rated voltage (12 volts). The third and fourth transistors N1/3 and N1/4 of the integrated circuit IC becomes conductive and the second transistor N1/2 of the integrated circuit is inhibited. For this condition, the actual value of the control assembly is generated from the voltage of the third user VC through the other resistor divider comprising the resistors R6 and R9.

Figure 3:
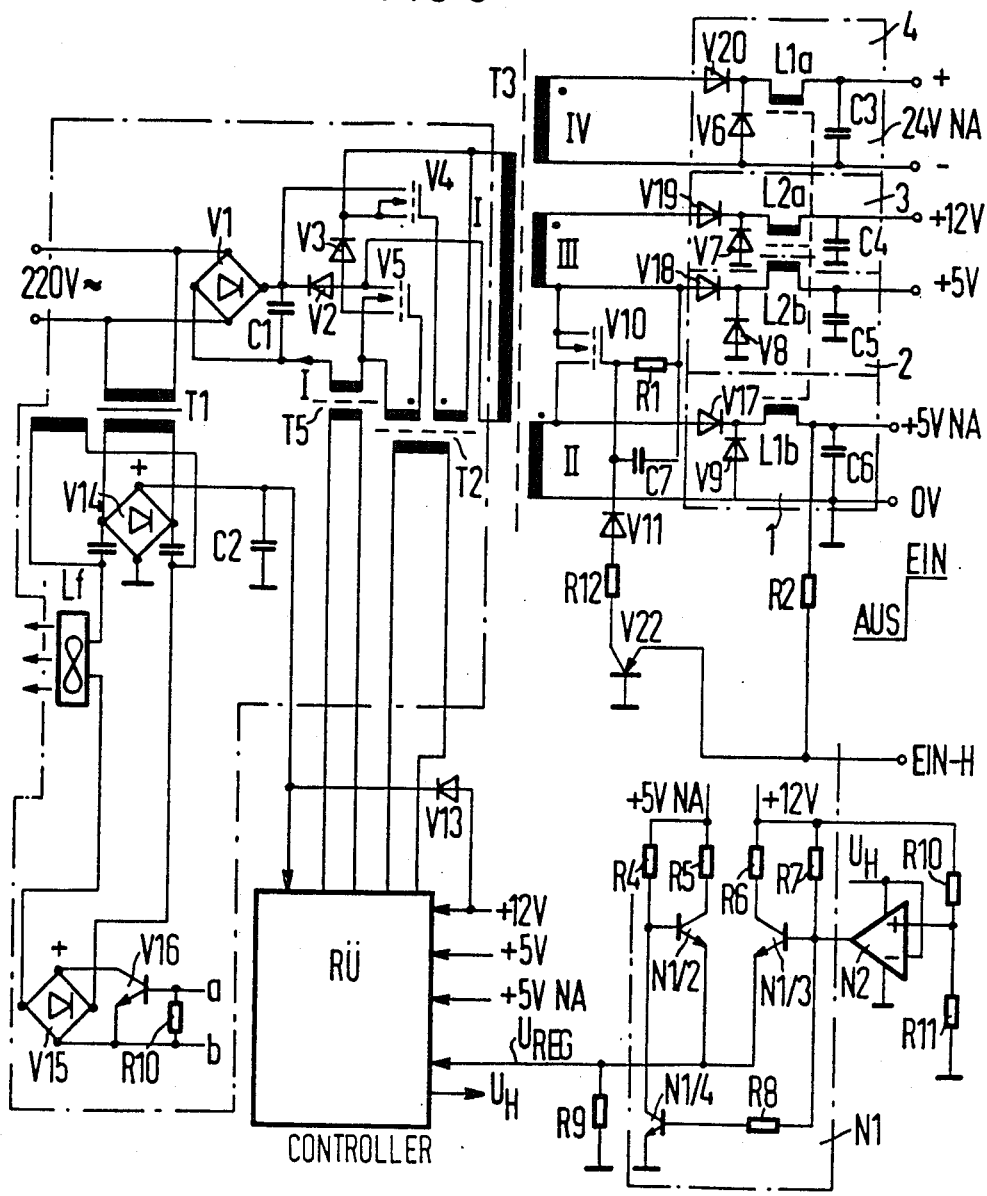
FIG. 3 is an electrical schematic of a second embodiment of the invention.

FIG. 3 illustrates a modification of the invention which has the same technical characteristics as that described in FIG. 2. The potential-free drive of the MOS transistor V10 shown in FIG. 2 is replaced in the embodiment of FIG. 3 by a galvonically coupled circuit comprising the second transistor V22, the fourth resistor R12, the second capacitor C7 and the second resistor R1. The second transistor V22 operates with a base circuit which functions as a constant current source and is driven with the signal EIN-H. The source electrode of the MOS transistor V10 becomes negative during the demagnetization phase of the first transformer T3. When the second transistor T22 is conducting the second capacitor C7 is slowly charged through the fourth resistor R12. The MOS transistor V10 becomes conductive. The second diode V11 prevents discharge of the second capacitor C7 when the gate electrode of the MOS transistor V10 becomes positive during current flow. A second winding of the line transformer T1 is required for supplying the fan Lf. The embodiment of FIG. 3 has a primary side circuit which corresponds to that illustrated in FIG. 2.

It is to be noted for full operating condition that the generation of the voltages for the first and second users VA, VB (5 volts, and 5 volts NA) and a partial voltage for the third user VC (12 volts) from the winding II of the first transformer T3 occurs. The first secondary winding II of the first transformer T3 thus is in series with the MOS transistor V10 in the control loop. This type of circuit assures low output voltage dependencies of the voltages for the first and second users VA, VB (5 volts; 5 volts NA) on different load currents since it is only essential that the voltage drops at the second freewheeling diode V8 and the second substorage inductor L2$b$ or, respectively, at the first free-wheeling diode V9 and the first substorage inductor L1$b$ which affect the load dependency. The execution of the storage inductors L2 and L1 as double inductors also reduces the load dependencies.

The adaptation of the output voltage to different load ranges can occur by selecting diodes having different threshold voltages. Voltage dependent control circuit switch-over is of significance for the turn-on in full operating mode and for immediate switch-over the control circuit to plus 5VNA is of significance for the switch-over in auxiliary or standby mode.

Voltage dependent control switch-over is of significance for avoiding over-voltages and under-voltages for the switch-over of the operating conditions.

Although the invention has been described with respect to preferred embodiments, it is not to be so limited as changes and modifications can be made which are within the full intended scope of the invention as defined by the appended claims.

We claim as our invention:

1. A single-ended flow converter which is clocked at its primary side and which is provided with a regulator controller, comprising a plurality of switchable power packs which are connected by secondary windings and are composed of an electronic switch, a storage inductor, a free-wheeling diode and a smoothing capacitor and which, respectively, supply a DC user, characterized in that at least one secondary winding (T3 III) has a further switched power pack (2) associated with it that one electronic switch (V19) has its associated storage inductor (L2a) connected to a first end of the one secondary winding (T3 III) and an other electrical switch (V18) has its storage inductor (L2b) connected to a second end of said one secondary winding (T3 III) and at least one of the associated free-wheeling diodes (V7, V8) and the smoothing capacitors (C4, C5, 2', 3) have first terminals connected to ground; a second switch (K1) connected between said second end of said one secondary winding (T3 III) and a first end of at least one further secondary winding (T3 II); and a switch-over means (K2) which is actuated depending on the position of said second switch (K1) and has a first switch-over contact connected by a first resistor (R5) to the voltage-conducting output of one of said switched power packs (1) which is connected at the secondary side and has a secnd switch-over contact connected by a second resistor (R6) to a voltage-conducting output of another of said switched power packs (3) which are connected at the secondary side; and a common switch contact of said switch-over means (K2) connected to ground through a third resistor (R9) and to the input of said regulator controller (RU).

2. A single-ended flow converter according to claim 1, characterized in that said second switch (K1) and said switch-over means (K2) are semiconductor switches.

3. A single-ended flow converter according to claim 2, characterized in that said second switch (K1) is thereby dimensioned such that, when said second switch is switched on, the voltage rises according to a time function and said switch-over means (K2) is not actuated until immediately before the rated voltage is reached.

4. A single-ended flow converter according to claim 1 wherein said second switch (K1) is an MOS transistor.

5. A single-ended flow converter according to claim 1 wherein said switch over-means (K2) is formed as an integrated circuit.

6. A single-ended flow converter according to claim 5 wherein said integrated circuit comprises three transistors.

7. A single-ended flow converter according to claim 6 including an operational amplifier (N2) which is connected to said integrated circuit.

8. A single-ended flow converter according to claim 4 including a time delay circuit comprising a capacitor C7 and a resistor (R12) connected in the control circuit of said MOS transistor (V10) which forms the second switch (K1).

9. A single-ended flow converter according to claim 8 including a second transformer which has a secondary winding (W II) connected to said MOS transistor (V10) through a diode (V II) and said capacitor (C7).

10. A single-ended flow converter according to claim 8 comprising a transistor (V22), said resistor (R12) and a diode (V11) which supplies a drive signal to said MOS transistor (V10).

* * * * *